(12) United States Patent
Taniguchi et al.

(10) Patent No.: US 8,101,119 B2
(45) Date of Patent: Jan. 24, 2012

(54) ELECTROMAGNETIC STIRRER (75) Inventors: Shoji Taniguchi, Miyagi (JP); Koichi Anzai, Miyagi (JP); Kazuyuki Ueno, Miyagi (JP); Masayuki Itamura, Tokyo (JP); Shinichi Shimasaki, Miyagi (JP)

(73) Assignees: Japan Science and Technology Agency, Saitama (JP); Tohoku Techno Arch Co., Ltd., Miyagi (JP); Nano-Cast Corporation, Tokyo (JP)

( * ) Notice: Subject to any disclaimer, the term of this patent is extended or adjusted under 35 U.S.C. 154(b) by 307 days.

(21) Appl. No.: 12/514,411

(22) PCT Filed: Nov. 12, 2007

(86) PCT No.: PCT/JP2007/071945
§ 371 (c)(1),
(2), (4) Date: Jun. 12, 2009

(87) PCT Pub. No.: WO2008/056809
PCT Pub. Date: May 15, 2008

(65) Prior Publication Data
US 2010/0044934 A1    Feb. 25, 2010

(30) Foreign Application Priority Data
Nov. 10, 2006    (JP) .................................. 2006-305359

(51) Int. Cl.
*C21C 7/00* (2006.01)

(52) U.S. Cl. ........................................ 266/234; 266/242
(58) Field of Classification Search .................. 266/234, 266/242
See application file for complete search history.

(56) References Cited

U.S. PATENT DOCUMENTS

| 4,281,263 | A | | 7/1981 | Virolleau et al. |
| 5,025,852 | A | * | 6/1991 | Mayrhofer ..................... 164/468 |
| 5,462,572 | A | * | 10/1995 | Tallback ....................... 266/234 |
| 6,010,552 | A | | 1/2000 | Gasperetti et al. |
| 2010/0148411 | A1 | * | 6/2010 | Araseki et al. ................ 266/234 |

FOREIGN PATENT DOCUMENTS

| JP | 48-71104 | 9/1973 |
| JP | 54-163729 | 12/1979 |
| JP | 2003-220323 | 8/2003 |

* cited by examiner

*Primary Examiner* — Scott Kastler
(74) *Attorney, Agent, or Firm* — Young & Thompson (57) ABSTRACT

An object is to provide an electromagnetic stirrer that can provide an excellent stirring force more than before. An electromagnetic stirrer has a vertical electromagnetic field generating coil (1) vertically and circumferentially provided on the outer side of a container (5), and a rotational electromagnetic field generating coil (2) provided on the outer side of the vertical electromagnetic field generating coil (1), in which an iron core (3) is inserted between the vertical electromagnetic field generating coils (1) and between the rotational electromagnetic field generating coils (2), the iron core (3) being formed of a magnetic material with magnetic isotropy and having comb teeth 3*a* extended to the inner surface of the vertical electromagnetic field generating coil (1).

6 Claims, 9 Drawing Sheets

MAGNETIC FLUX DENSITY (X) – INTENSITY [T]

ELECTROMAGNETIC STIRRER

TECHNICAL FIELD

The present invention relates to an electromagnetic stirrer, and more specifically to a double-axis electromagnetic stirrer that strongly and uniformly stirs liquid metal in a noncontact manner.

BACKGROUND ART

The double-axis electromagnetic stirrer is an electromagnetic stirrer that can effectively convey the magnetic fluxes of a vertical electromagnetic field and a rotational electromagnetic field to liquid metal inside a container and set the liquid metal in rotational motion and vertical motion when these electromagnetic fields are superposed on each other.

Conventionally, as the double-axis electromagnetic stirrer, techniques described in Patent Document 1 and Patent Document 2 are known.

Figure 8:
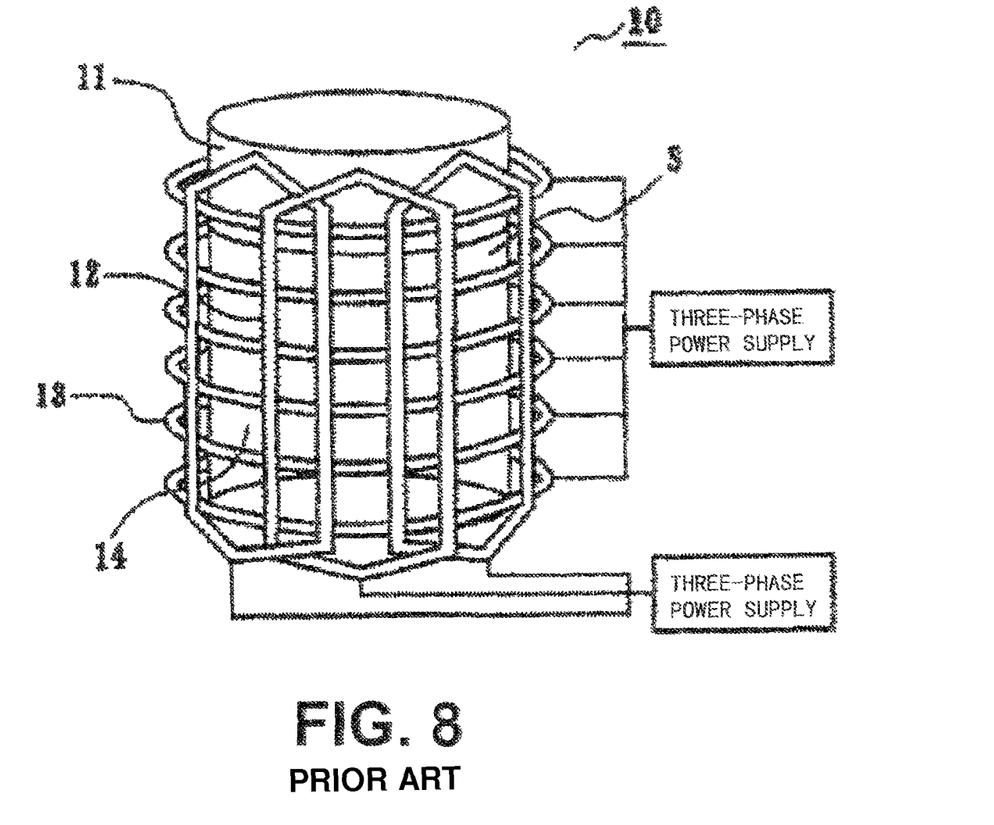
FIG. 8 is a perspective view depicting a double-axis electromagnetic stirrer before.

In these techniques, as shown in FIG. 8, a vertical electromagnetic field generating coil 13 is circumferentially provided on the outer side of a cylindrical container 11 along the vertical direction, and a rotational electromagnetic field generating coil 12 is circumferentially provided on the outer side of the container 11. The rotational electromagnetic field generating coil 12 sets liquid metal in the container 11 in rotational motion, and the vertical electromagnetic field generating coil 13 sets the liquid metal in vertical motion.

However, the techniques described in Patent Document 1 and Patent Document 2 have a problem that the magnetic fluxes are leaked and as the result it is difficult to obtain a sufficient stirring force.

Figure 9:
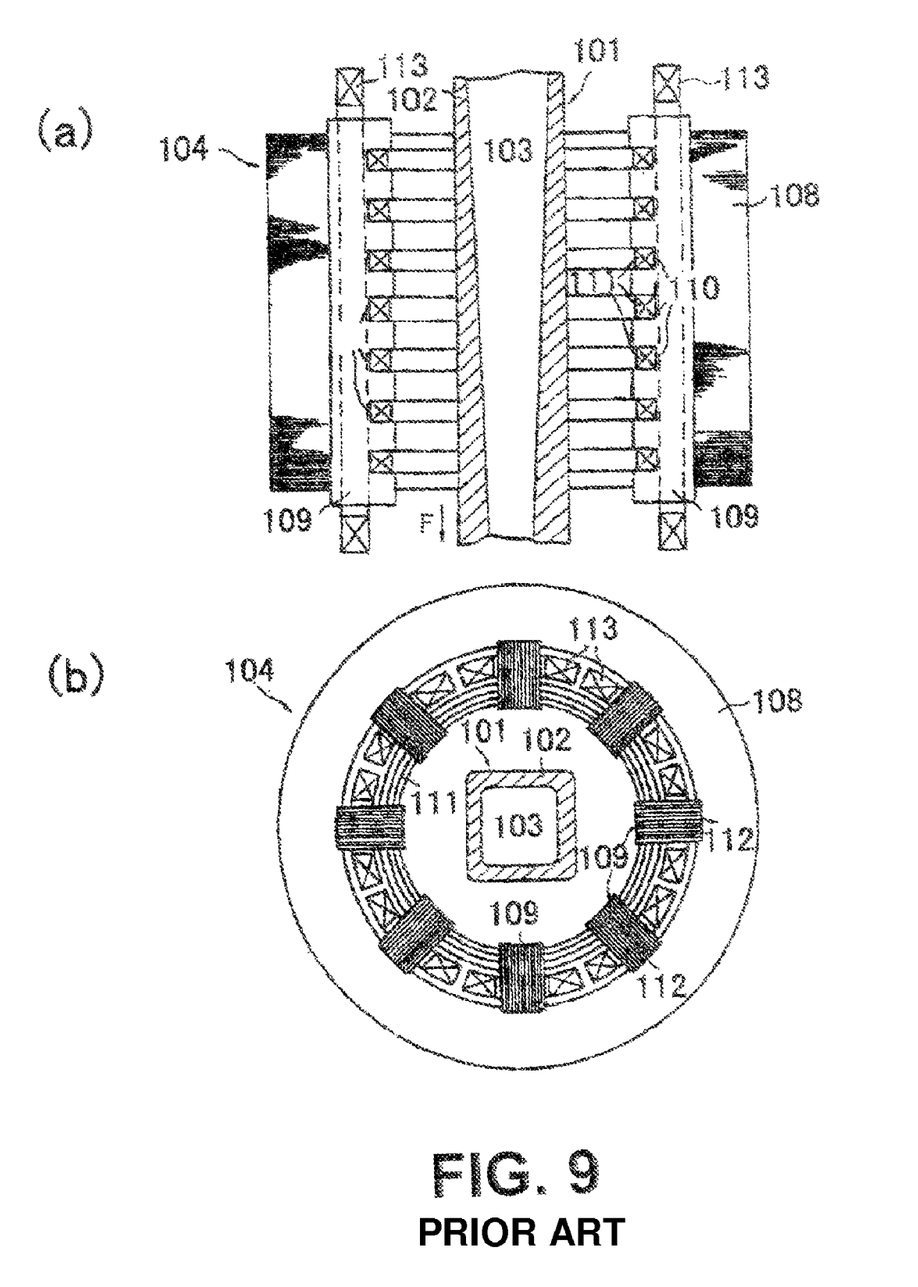
FIG. 9 is a double-axis electromagnetic stirrer before; (a) is a longitudinal section, and (b) is a transverse section.

On the other hand, as a technique that prevents the leakage of magnetic flux to increase stirring force, a technique is described in Patent Document 3 in which an iron core is inserted between rotational electromagnetic field generating coils and between vertical electromagnetic field generating coils. "FIG. 2" of Patent Document 3 is shown in FIG. 9.

This drawing shows an example in which vertical electromagnetic field generating coils 111 are arranged on the inner side and rotational electromagnetic field generating coils 113 are arranged on the outer side. In other words, this stirrer has a container 103 for liquid metal, the vertical electromagnetic field generating coils 111 arranged along the vertical direction of the container 103, the rotational electromagnetic field generating coils 113 circumferentially arranged on the outer side of the vertical electromagnetic field generating coil 111, and an iron core 109 that is inserted into the center of the rotational electromagnetic field generating coil 113 and has comb teeth extended to the inner surface of the vertical electromagnetic field generating coil 111.

Figure 10:
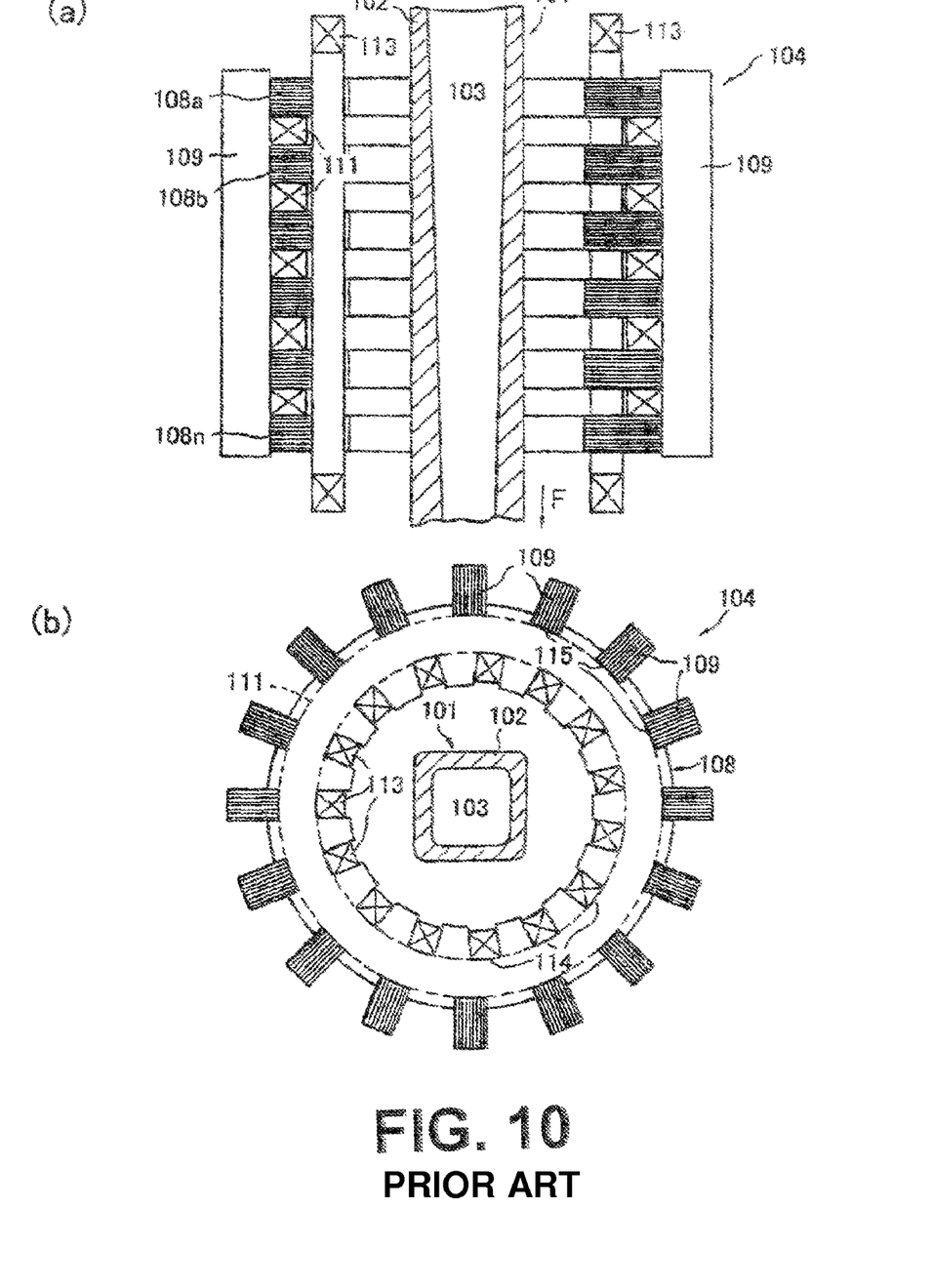
FIG. 10 is a double-axis electromagnetic stirrer before; (a) is a longitudinal section, and (b) is a transverse section.

FIG. 10 shows a diagram depicting "FIG. 3" of Patent Document 3.

This drawing shows an example in which vertical electromagnetic field generating coil 111 are arranged on the outer side, and rotational electromagnetic field generating coils 113 are arranged on the inner side.

Thus, the technique described in Patent Document 3 has less leakage of magnetic flux than that of the technique with no iron core. However, when taking a look at stirring force for liquid metal inside the container, the stirring force is not so dramatically improved as compared with the case of providing the iron core.

Patent Document 1: JP 2003-220323 A
Patent Document 2: JP 2007-144501 A
Patent Document 3: JP 1979-163729 A

DISCLOSURE OF THE INVENTION

Problems that the Invention is to Solve

It is an object of the present invention to provide a double-axis electromagnetic stirrer that can provide an excellent stirring force more than before.

Means for Solving the Problems

The present invention is a liquid metal electromagnetic stirrer including: a vertical electromagnetic field generating coil vertically and circumferentially provided on the outer side of a liquid metal container, and a rotational electromagnetic field generating coil provided on the outer side of the vertical electromagnetic field generating coil, in which an iron core is inserted between the vertical electromagnetic field generating coils and between the rotational electromagnetic field generating coils, the iron core being formed of a magnetic material with magnetic isotropy and having comb teeth extended to the inner surface of the vertical electromagnetic field generating coil.

Advantage of the Invention

The effect and advantages of the present invention will be described along with the findings obtained in implementing the present invention.

The inventors diligently investigated the reasons why it is difficult to always obtain an excellent stirring force even though an iron core is provided between coils in order to prevent the leakage of magnetic flux.

As the result, the following findings were obtained.

In FIG. 9, the vertical electromagnetic field iron core 109 is arranged on the inner side, and the rotational electromagnetic field iron core 108 is arranged on the outer side. The plates of the iron cores 108 and 109 are formed of a laminated product. Then, the vertical electromagnetic field iron core 109 and the rotational electromagnetic field iron core 108 are arranged such that the laminated direction of the vertical electromagnetic field iron core 109 is circumferential and the laminated direction of the rotational electromagnetic field iron core 108 is vertical. In other words, in order to reliably confine the leakage of magnetic flux, the iron cores 108 and 109 have magnetic anisotropy.

However, because the iron cores 108 and 109 have anisotropy, a vertical electromagnetic field causes eddy current to be carried through the iron core 108 on the outer side, and a rotational electromagnetic field causes eddy current to be carried through the iron core 109 on the inner side for occurrence of losses.

FIG. 10 shows an example in which a vertical electromagnetic field iron core is arranged on the outer side, and a rotational electromagnetic field iron core is arranged on the inner side. Similarly to the example in FIG. 9, eddy current is carried therethrough to cause losses.

In other words, such findings were obtained that in magnetic fields traveling along two axes, the influence of the other axis leads to the occurrence of eddy current in the iron core and this seems to be a cause to put a limit to stirring force.

As described above, based on the above-described findings that in the case of the magnetic fields traveling along two axes, it is important to also prevent the influence of the magnetic field traveling along the other axis, it was experimented to configure an iron core of a magnetically isotropic material, and it was found that an excellent stirring force can be achieved.

In addition, in FIG. 10, as the reason other than the reasons described above, because the vertical electromagnetic field generating coils are arranged at the position away from liquid metal, it is difficult to expect to effect vertical stirring power, which leads to a cause of a small stirring force. In the present invention, the vertical electromagnetic field generating coil is arranged on the inner side.

In addition, losses caused by eddy current in the stirrers in FIGS. 9 and 10 bring not only a reduction in stirring force but also a temperature rise of the iron cores, and it is necessary to cool the iron cores in particularly stirring liquid metal at high temperature. In contrast to this, in the present invention, it is unnecessary to cool the iron core because there is no temperature rise caused by the occurrence of eddy current. In addition, even though the iron core is configured of a magnetically isotropic material, the leakage of magnetic flux to outside the electromagnetic stirrer can be prevented.

Advantage of the Invention

In the present invention, in order to adapt to the orientations of two magnetic fluxes in double-axis electromagnetic stirring, an iron core is configured with a non-oriented (that is, isotropic) iron core material having no anisotropy. An exceptionally stronger double-axis electromagnetic stirring than before can be implemented as losses caused by eddy current are suppressed.

As the result of suppressing the losses caused by eddy current, heat generation of the iron core can be decreased. This also allows a shorter distance (gap) between the end surface of the iron core on the inner side and liquid metal, and allows vertical electromagnetic force to effectively work.

Consequently, a much greater stirring force can be provided to liquid metal.

DESCRIPTION OF REFERENCE NUMERALS AND SIGNS 1 vertical electromagnetic field generating coil
2 rotational electromagnetic field generating coil
3 vertical and rotational electromagnetic field iron core
4 rotational electromagnetic field yoke
5 container
11 container
12 rotational electromagnetic field generating coil
13 vertical electromagnetic field generating coil
S liquid metal
108 rotational electromagnetic field iron core
109 vertical electromagnetic field iron core
111 vertical electromagnetic field generating coil
113 rotational electromagnetic field generating coil

BEST MODE FOR CARRYING OUT THE INVENTION

In the present invention, preferably, a resistivity of the iron core is 0.1 Ω·m or above regardless of a current direction.

Losses caused by eddy current carried through the iron core are suddenly increased from a boundary of 0.1 Ω·m or below. Therefore, preferably, the resistivity is 0.1 Ω·m or above, and more preferably, 0.1 to 1000 Ω·m.

In addition, for materials, ferrite, a dust core material having insulating coating, an Fe-based amorphous material, and the like may be used.

Ferrite is a magnetically isotropic material. For soft magnetic materials used as an iron core, Ni—Zn-based materials, Mn—Zn-based materials, Cu—Zn-based materials, and the like are named. In addition, other than ferrite, for soft magnetic materials of magnetic isotropy, non-oriented silicon steel (Fe—Si alloy), permalloy (Fe—Ni alloy), sendust (Fe—Si—Al alloy), Permendur (Fe—Co alloy), amorphous metals, and other materials (such as sintered metal powder) are named.

In the present invention, preferably, a plurality of the iron cores is concentrically aid radially arranged, and the iron cores are joined with a yoke on the outer side of the rotational electromagnetic field generating coils to confine magnetic flux of a rotational electromagnetic field.

Thus, the leakage of magnetic flux can be considerably prevented, whereby a highly excellent stirring force can be obtained.

In the present invention, preferably, a distance between the inner end surface of the iron core and a container is kept within 30% of the inner diameter of a container.

In the technique described in Patent Document 3, the occurrence of eddy current causes a temperature rise of the iron cores. In order to prevent an excessive temperature rise, the iron cores are limited in being brought close to a container at high temperature. In other words, the stirrers shown in FIGS. 9 and 10 have impediments to the iron cores to be brought close to the container. Therefore, in FIGS. 9 and 10, as shown in the drawings, a gap is provided nearly about 100% of the inner diameter of the container.

In contrast to this, in the present invention, because heat generation caused by eddy current is prevented, the iron cores can be brought close to the container.

When the gap is set to within 30% of the inner diameter of the liquid metal container, the electromagnetic force is about 40% of that in the case of providing no gap. More specifically, preferably, the gap is within 30% from the reason that about 40% or more of the electromagnetic force is allowed to effectively work.

When liquid metal at high temperature is brought close to the coils and the iron cores, the metal affects the temperatures of the coils and the iron cores. Because the coils and the iron cores have upper limits to heat-resistant temperatures, it is sufficient that thermal design is conducted so as not to exceed the heat-resistant temperatures.

For example, it is sufficient that the coils and iron cores are forcedly cooled (cooled by air or water), or a heat insulating mechanism is provided between liquid metal and the coils and iron cores.

For example, a superconducting coil may be operated immediately close to liquid metal at high temperature (the coil is at a very low temperature because the coil is cooled by liquid helium) When such a heat insulating mechanism is used, liquid metal can be brought close to the coils/the iron cores to a considerable extent.

From the descriptions above, the distance to the container of the end surface has no lower limits.

In the present invention, a magnetic material having no directional properties is used for the iron core.

For the material, ferrite and a dust core material having insulating coating are preferably used.

In addition, for ferrite, because of low resistivity, Mn—Zn ferrite or Ni—Zn ferrite is preferable.

In the present invention, preferably, the rotational electromagnetic field generating coil and the vertical electromagnetic field generating coil are separately controllable.

The coils are separately controllable, whereby the rotational motion and vertical motion can be separately controlled and applied to the liquid metal, and the degree of stirring the liquid metal can be freely set. In addition, when both of rotational and vertical electromagnetic forces are applied at the same time, vertical motion is superposed without loss of rotational motion. When the ratio between the rotational electromagnetic force and the vertical electromagnetic force is freely controllable, the ratio is controlled to also control the ratio between rotational motion and vertical motion. In addition, stirring modes can be freely changed from linear stirring in the vertical direction of the container to rotational stirring. Furthermore, such original control allows a downward flow and an upward flow to be readily generated in the outer portion and the center portion of the liquid metal inside the container, and the surface of the liquid metal can be maintained flat.

Metal refining processing is taken as an example. For example, in metal refining processing, various types of stirring are used in order to accelerate: (1) the increase of reaction velocity, (2) the uniformization of temperatures and components, (3) the aggregation of inclusions, and so on. Basically, the stronger stirring intensity is, the more convenient it becomes for the purposes above.

On the other hand, as stirring becomes stronger, turbulence in the liquid surface inevitably becomes greater. In metal refining processing, slag or powder is often floated in the liquid surface, and there are metal oxides in the liquid surface even though neither slag nor powder is used. When the liquid surface becomes unstable, these foreign substances (inclusions) are engulfed into the liquid to adversely affect product quality. In other words, there is a demand that a stronger stirring is desired, whereas the liquid surface is desired to be kept flat and calm.

In fact, in order to resolve these contradictions, various schemes are conceived such that an electromagnetic break is applied near the liquid surface to reduce the velocity of the liquid while stirring is applied. The biggest characteristic of double-axis electromagnetic stirring is that a strong stirring can be applied to inside liquid while the liquid surface is kept flat and calm.

Embodiment 1

An embodiment of the present invention will be described with reference to FIG. 1.

A stirrer of this embodiment has a vertical electromagnetic field generating coil 1 vertically and circumferentially provided on the outer side of a container 5, and a rotational electromagnetic field generating coil 2 provided on the outer side of the vertical electromagnetic field generating coil 1, in which an iron core 3 is inserted between the vertical electromagnetic field generating coils 1 and between the rotational electromagnetic field generating coils 2, the iron core 3 being formed of a magnetic material with magnetic isotropy and having comb teeth 3a extended to the inner surface of the vertical electromagnetic field generating coil 1.

Hereinafter, the embodiment will be described more in detail.

For the container 5, for example, a metal container having an inner diameter of 55 mm and a height of 150 mm is used. For the rotational electromagnetic field generating coil 2, for example, a rectangular coil piece is used. For the vertical electromagnetic field generating coil 1, for example, a circular coil piece is used.

To the rotational electromagnetic field generating coil 2, for example, current is carried from a 50-Hz three-phase AC power supply through a voltage regulator, and three-phase alternating current at a given frequency is carried to the vertical electromagnetic field generating coil 3 through a frequency variable inverter.

In addition, the numbers of the rotational electromagnetic field generating coils 2 and the vertical electromagnetic field generating coils 1 are not limited particularly, which are freely set depending on the types and amounts of liquid metals to be pored into the container 5 for stirring, and on the modes and intensity of stirring. In the example shown in FIG. 1, the numbers of the rotational electromagnetic field generating coils 2 and the vertical electromagnetic field generating coils 1 are six coils each.

In addition, it is unnecessary to restrict the number of coils to six coils. However, when three-phase alternating current is used for power supply, the number of coils is a multiple of three.

In the rotational electromagnetic field generating coil, because two coils facing each other are paired to generate a penetrating magnetic field, 3×2=6 coils are preferable. In the case of three coils, stirring force is weak because the magnetic field does not penetrate. In the case of 12 coils, the space for mounting coils might not be secured. Therefore, six coils are the optimum.

Also for the vertical electromagnetic field generating coil, similarly, configurations of three coils, six coils, 12 coils, 18 coils, 24 coils, etc are possible. However, in the configuration of three coils, stirring force is too weak, and in the configuration of 18 coils or more, the stirrer is unnecessarily upsized. Therefore, a six-coil configuration is the optimum, and a 12-coil configuration is the second best.

On the other hand, in the embodiment, seven comb teeth 3a are provided in the longitudinal section as adapted to the numbers of the rotational electromagnetic field generating coils and the vertical electromagnetic field generating coils. The tooth 3a is extended toward the container 5 side, and the tip end is extended to the inner surface of the vertical electromagnetic field generating coil 1. In the example shown in FIG. 1, the tooth 3a is extended toward the container 5 side beyond the inner surface, and extended to just near the outer wall of the container 5.

For the iron core 3, six cores are circumferentially and uniformly spaced, and each of the iron cores is inserted between the rotational electromagnetic field generating coils 2. In addition, six iron cores are joined with a yoke 4 on the outer side of the rotational electromagnetic field generating coils 2. In addition, preferably, the iron cores and the yoke 4 are individually designed to have a cross section large enough so as to prevent saturation caused by magnetic flux generated by the double-axis electromagnetic stirrer.

Experiment 1

Next, the following specific values were set for experiment.
Iron Core
    Material: Ni—Zn ferrite
    Resistivity: 3 Ω·m
Container
    Material stainless steel (SUS304)
    Inner diameter 140 mm
    Material thickness 8 mm
Liquid level of liquid metal: 690 mm
Gap: 21 mm (the ratio between the gap and the inner diameter of the container: about 13%)
Current Conditions
    Vertical electromagnetic field:
    Phase-to-phase voltage: 400 V
    Line current: 30 A
    Rotational electromagnetic field:
    Phase-to-phase voltage: 315 V
    Line current: 30 A
    Under the above-described conditions, the magnetic lines of force and the magnetic flux density were measured.

Figure 2:
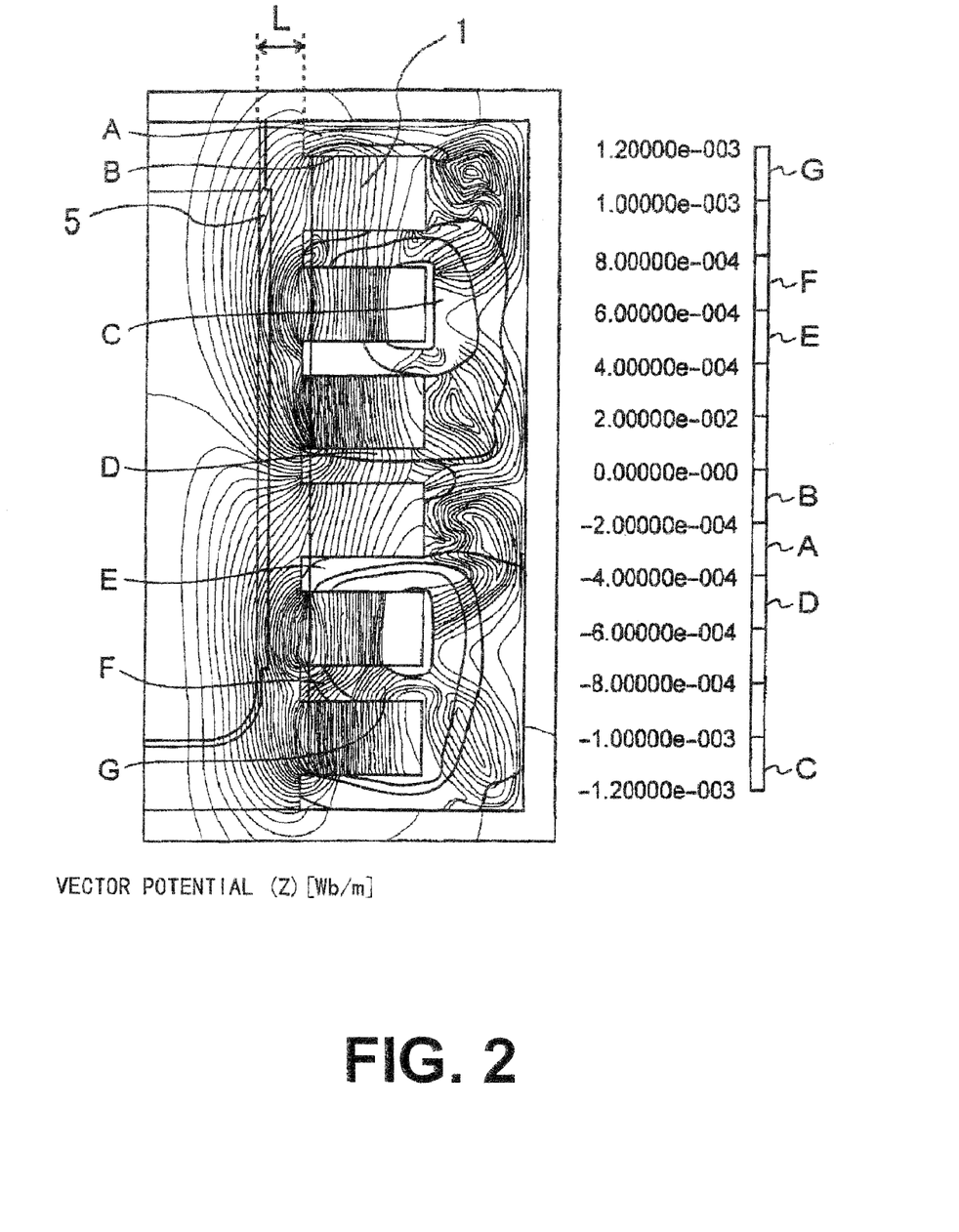
FIG. 2 is a figure of magnetic lines of force depicting the vertical electromagnetic field in the double-axis electromagnetic stirrer (with an iron core) which is an exemplary figure of magnetic lines of force when an iron core is provided.
Figure 4:
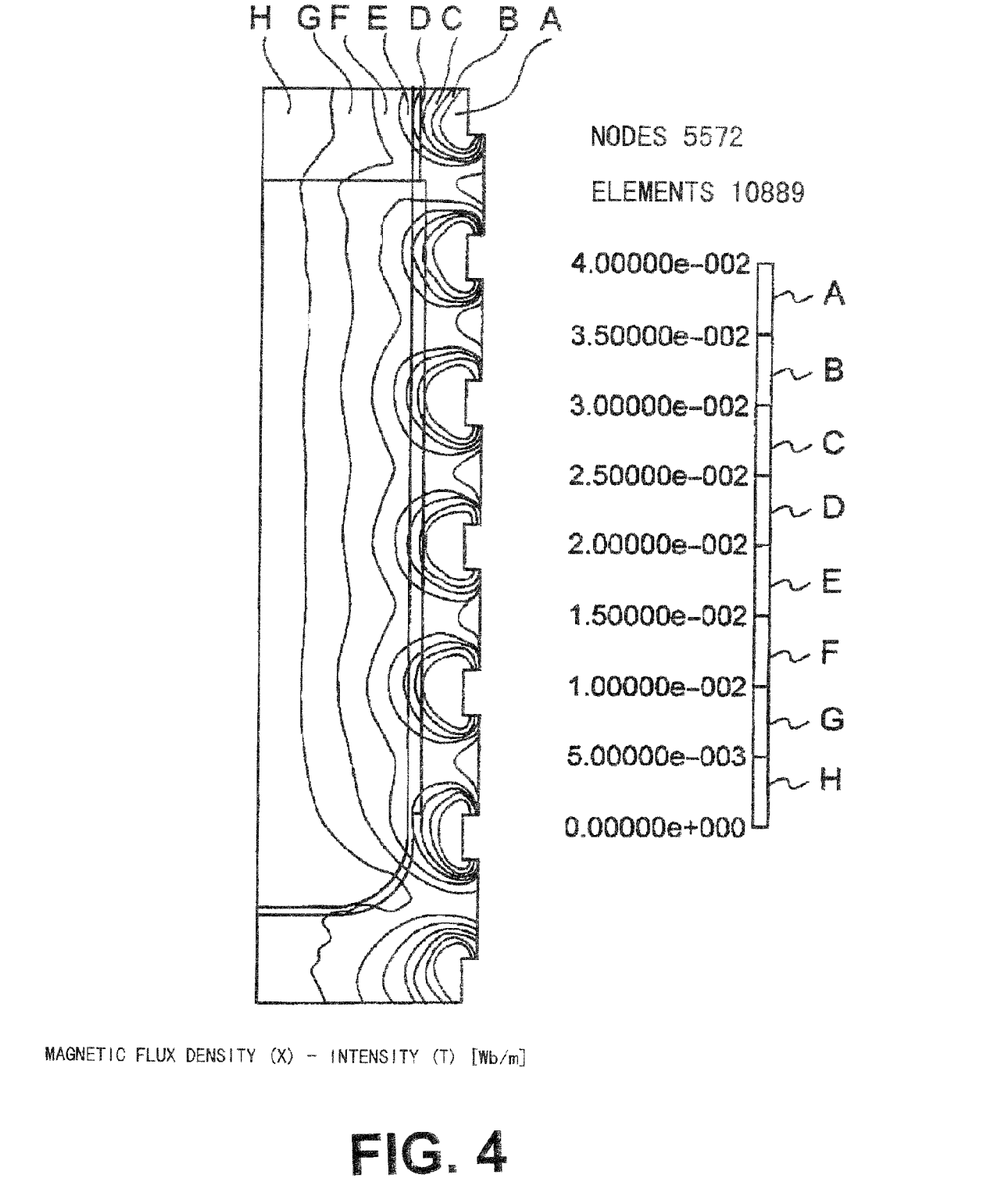
FIG. 4 is the magnetic flux density of the vertical electromagnetic field in the double-axis electromagnetic stirrer (with an iron core), which is an exemplary magnetic flux density when an iron core is provided.
Figure 6:
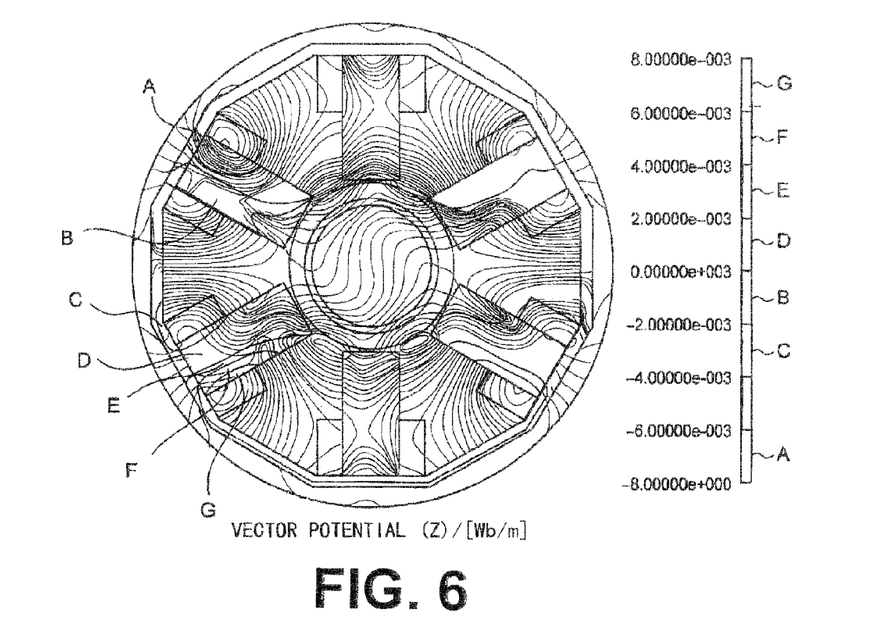
FIG. 6 is a figure of magnetic lines of force depicting the rotational electromagnetic field in the double-axis electromagnetic stirrer (with an iron core) which is an exemplary figure of magnetic lines of force when an iron core is provided.

FIG. 2 shows a figure of magnetic lines of force depicting the vertical electromagnetic field in the stirrer of the embodiment, FIG. 4 shows the magnetic flux density of the vertical electromagnetic field, and FIG. 6 shows a figure of magnetic lines of force depicting the rotational electromagnetic field.

Comparative Example

In this example, an experiment was conducted similarly to Embodiment 1 with no iron core.

The conditions are the same as those in Embodiment 1 except using no iron core. The experimental results are shown in FIGS. 3 and 5.

Figure 3:
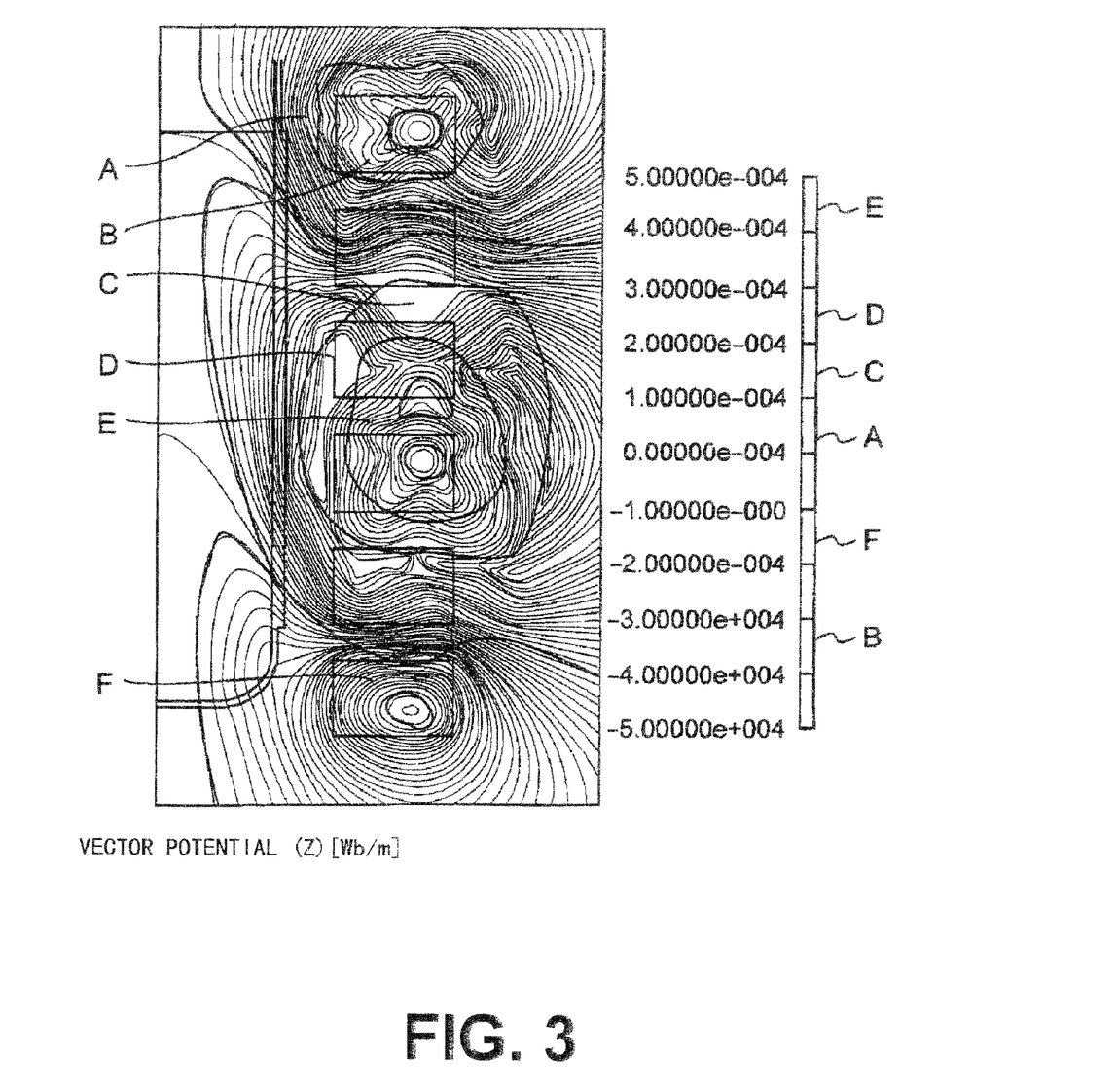
FIG. 3 is a figure of magnetic lines of force depicting the vertical electromagnetic field in the double-axis electromagnetic stirrer (with no iron core) which is an exemplary figure of magnetic lines of force when no iron core is provided.

FIG. 2 shows a figure of magnetic lines of force when an iron core is provided, and FIG. 3 shows a figure of magnetic lines of force when no iron core is provided. It is shown that the distributions of magnetic flux density are greatly varied depending on the presence of iron cores.

Figure 5:
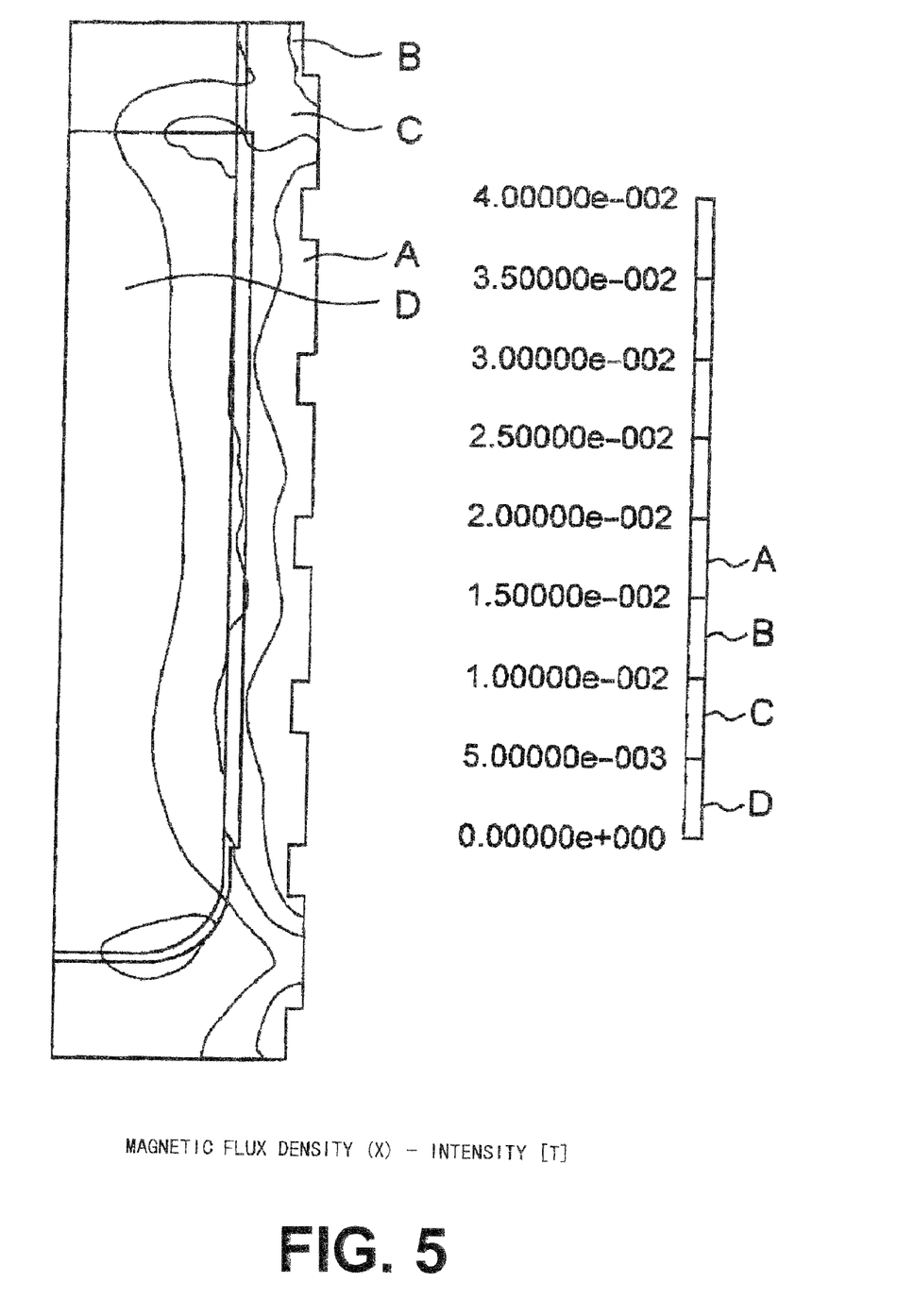
FIG. 5 is the magnetic flux density of the vertical electromagnetic field in the double-axis electromagnetic stirrer (with no iron core), which is an exemplary magnetic flux density when no iron core is provided.

FIG. 4 shows magnetic flux density when an iron core is provided, and FIG. 5 shows magnetic flux density when no iron core is provided. When the same power supply is used, the magnetic flux density is varied by about two times depending on the presence of iron cores.

Because the electromagnetic force for stirring is effected by the square of magnetic flux density, consequently, the stirring force is improved about four times.

FIG. 6 shows a figure of magnetic lines of force depicting the rotational electromagnetic field when an iron core is provided. Similarly to the vertical electromagnetic field, it is shown that the magnetic flux reaches liquid metal at the center portion because of the presence of iron cores.

Embodiment 2

In this embodiment, the relationship between the distance (gap) (L shown in FIG. 2) from the end surface of the iron core on the inner side (that is, the end surface of the comb teeth) to liquid metal and the stirring force was determined as follows.

The electromagnetic force in the vertical direction generated in the surface of liquid metal by the vertical electromagnetic field ($r = D/2$, where D is the inner diameter of the container), $$F_z|_{r=D/2}$$

can be generally expressed by the following equation (Electromagnetic Processing of Materials, Research Group on Electromagnetic Processing of Materials, Iron and Steel Institute of Japan, Tohoku University Press (1999)).

$$F_z|_{r=D/2} = \frac{\sigma \omega}{2K}(B_r|_{r=D/2})^2$$

where ω is the conductivity of liquid metal (S/m), σ is the angular frequency of applied current (rad/s), K is the wave number of the vertical magnetic field (1/m) and $$B_r|_{r=D/2}$$

is the radial component (T) of the magnetic flux in the surface of liquid metal.

$$B_r|_{r=D/2}$$

is experimentally measured by a gauss meter to evaluate the equation below.

$$F_z|_{r=D/2}$$

This electromagnetic force is the force to drive liquid metal, and is the parameter directly relating to stirring force.

Figure 7:
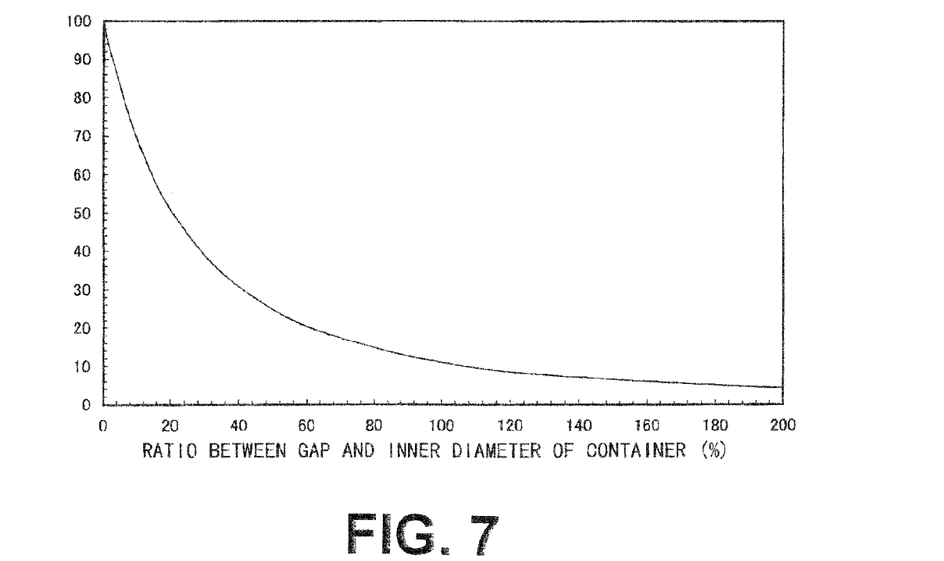
FIG. 7 is a graph depicting differences in electromagnetic force depending on a length of the distance (gap) between the end surface of an iron core on the inside and liquid metal.

FIG. 7 shows calculations of electromagnetic force when the inner diameter D of the container is varied.

FIG. 7 shows the magnitude of the vertical electromagnetic force acting upon the surface of liquid metal, when the same vertical electromagnetic field generating coils are used and the inner diameter of the container is varied. The horizontal axis is the ratio between the gap and the inner diameter of the container (L/D), and the vertical axis is the vertical electromagnetic force normalized without the gap.

As shown in FIG. 7, it is revealed that as the ratio (L/D) between the gap and the inner diameter of the container becomes greater, the vertical electromagnetic force becomes smaller.

As L/D is reduced, the electromagnetic force is suddenly increased from a 30% boundary. In other words, it is shown that there is a critical point at L/D=30%. Therefore, preferably, L/D is set to 30% or below.

Figure 1:
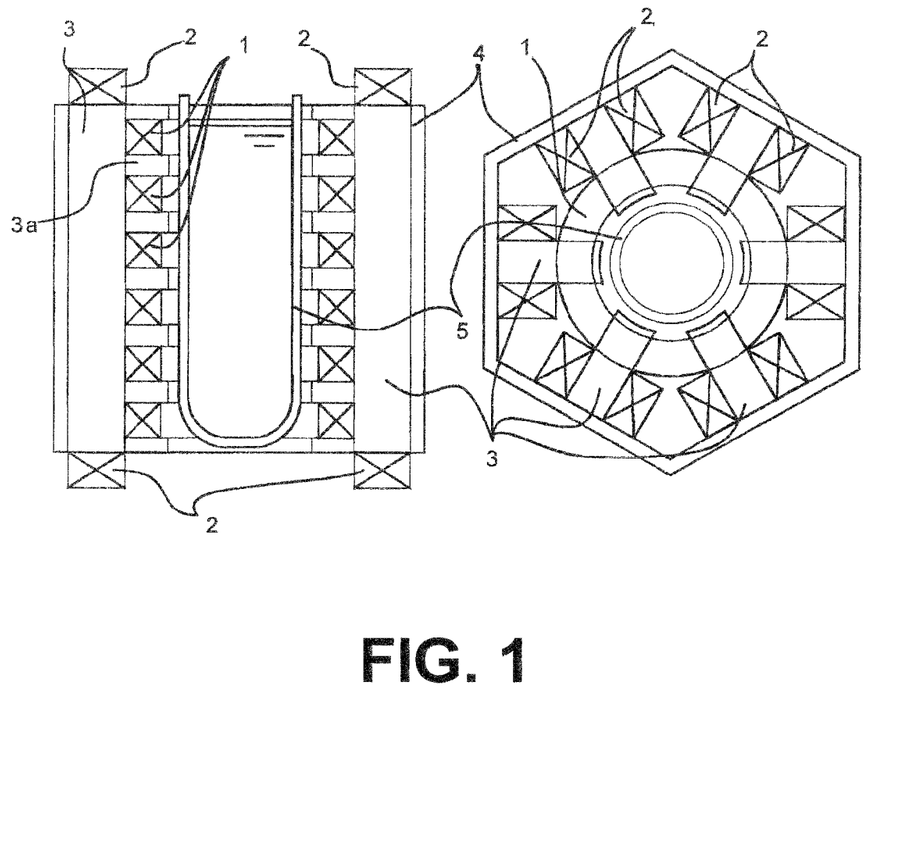
FIG. 1 is an exemplary configuration of a double-axis electromagnetic stirrer having an iron core, in which there is no losses caused by eddy current because the iron core is adapted to the magnetic fluxes of a vertical electromagnetic field and a rotational electromagnetic field.

Then, in the present invention, in order to efficiently lead the magnetic flux generated by the vertical electromagnetic field generating coil to liquid metal, the iron core is shaped in the form that the end surface of the iron core on the inner side is extended toward the inner side more than the vertical electromagnetic field generating coil (see FIG. 1). The distance (gap) between the end surface of the iron core on the inner side and liquid metal is made smaller as short as possible, whereby highly efficient stirring is made possible.

INDUSTRIAL APPLICABILITY

The present invention can be used mainly in the field of metal manufacture. Because stirring force stronger than before can be applied to liquid metal, the present invention can be adapted to the uniformization of component concentrations and temperatures, or to the aggregation and enlargement of inclusions in liquid metal.

As discussed above, the present invention has been described along with the embodiment of the present invention, the descriptions of the present invention are not limited to the discussions above, and any modifications and alternations are made possible without deviating from the scope of the teachings of the present invention.

The invention claimed is:

1. An electromagnetic stirrer, comprising:
    a vertical electromagnetic field generating coil vertically and circumferentially provided on an outer side of a container;
    a rotational electromagnetic field generating coil provided on an outer side of the vertical electromagnetic field generating coil; and
    an iron core formed of a magnetic material with magnetic isotropy and having comb teeth extended to an inner surface of the vertical electromagnetic field generating coil or to an inner side of the vertical electromagnetic field generating coil.

2. The electromagnetic stirrer according to claim 1, wherein a resistivity of the iron core is 0.1 Ω·m or above regardless of a current direction.

3. The electromagnetic stirrer according to claim 1, further comprising multiple ones of the iron core, each concentrically and radially arranged, and each of the iron cores being joined with a yoke on an outer side of multiple ones of the rotational electromagnetic field generating coil to confine magnetic flux of a rotational electromagnetic field.

4. The electromagnetic stirrer according to claim 1, wherein a distance between an inner end surface of the iron core and the container is within 30% of an inner diameter of the container.

5. The electromagnetic stirrer according to claim 1, wherein the magnetic material is ferrite or a dust core material having insulating coating.

6. The electromagnetic stirrer according to claim 1, wherein the ferrite is Mn—Zn ferrite or Ni—Zn ferrite.

* * * * *